United States Patent Office 3,491,136
Patented Jan. 20, 1970

3,491,136
ORGANODIPOTASSIUM SILANES AND PROCESS
FOR THE PRODUCTION THEREOF
Karl Nützel, Opladen, and Karl Dinges, Odenthal, Germany, assignors to Farbenfabriken Bayer Aktiengesellschaft, Leverkusen, Germany, a corporation of Germany
No Drawing. Filed July 6, 1966, Ser. No. 563,079
Claims priority, application Germany, Aug. 2, 1965,
F 46,778
Int. Cl. C07f 7/08; C08g 31/00
U.S. Cl. 260—448.2
9 Claims

ABSTRACT OF THE DISCLOSURE

Organodipotassium silanes corresponding to the following formula:

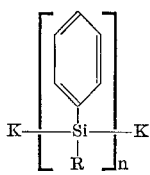

wherein $n$ is an integer from 1 to 16 and R is an aryl, alkaryl, $C_1$–$C_{12}$ alkyl or $C_5$–$C_{12}$ cycloalkyl radical, and process for preparing them which comprises adding 0.5 mol of a diorganodihalosilane having one of the formulae:

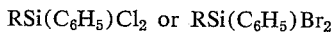

per gram atom of sodium to a dispersion of fused sodium in a liquid alkane, cycloalkane or aromatic hydrocarbon at a temperature of from 98 to 200° C. and adding to the reaction mixture per gram atom of Si, at a temperature below 60° C., 1 to 2 mols of a solvent constituting an electron-donor and 0.125 to 2 gram atoms potassium, the potassium being alloyed with sodium in the ratio of potassium to sodium of 4:1 to 5:1.

The organodipotassium silanes of the invention are useful as intermediates in the production of other substituted silanes and for the introduction of the diorganosilyl radical into other compounds.

---

This invention relates to novel potassium- and hydrocarbon- substituted mono- and poly-silanes of the formula

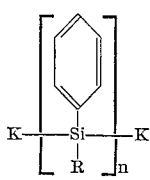

wherein $n$ is an integer from 1 to 16 and R is an aryl, alkaryl, $C_1$ to $C_{12}$ alkyl, or $C_5$ to $C_{12}$ cycloalkyl radical, and to a process for their production.

It is known to produce dilithium polydiphenylsilanes from cyclic phenylpolysilanes by ring-opening with lithium in tetrahydrofuran. These cyclopolysilanes are however obtainable only with difficulty and their splitting succeeds only with the purest reagents.

We have now found that the analogous potassium compounds can be produced in a manner capable of being easily performed from a technical standpoint, with high yields, from the readily available diorganodihalosilanes, especially from commercial diphenyldichlorosilane, by first converting the halosilanes with finely divided liquid sodium into polysilanes, and then splitting these without isolating them, after addition of an electron donor, by means of a liquid potassium-sodium alloy.

According to the present invention, therefore, a process for the production of a potassium- and hydrocarbon- substituted silane of the above general formula comprises gradually adding 0.5 mol of a diorganodihalosilane of the general formula

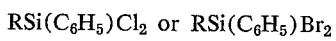

per gram atom of sodium to a dispersion of fused sodium in a liquid alkane, cycolalkane or aromatic hydrocarbon at a temperature in the range 98 to 200° C. with the exclusion of air and moisture, and adding to the reaction mixture thus obtained, per gram atom of Si, at a temperature below 60° C., 1 to 2 mols of a solvent with electron-donating properties and 0.125 to 2 gram atoms potassium, the potassium being alloyed with sodium in the weight ratio potassium:sodium of 4:1 to 5:1.

All of the reaction components are to be employed in the pure and, above all, anhydrous state. To exclude oxygen and water vapour it is advantageous to perform the reaction under a protective atmosphere of an inert gas such as the purest nitrogen or argon which can be under increased pressure without disadvantage.

Beside the above mentioned diphenyldichlorosilane, other suitable diorganodihalosilanes for use in the process of the invention include methylphenyldichlorosilane, cyclohexylphenyldichlorosilane and methylphenyldibromosilane. As dispersants for the sodium, inert hydrocarbons which boil above the melting point of sodium are suitable, such as toluene, xylene, tetrahydronaphthalene and octane. Xylene is to be preferred since it can be easily purified. For the dehalogenation of the halosilanes in the first step of the process, leading to penta- and higher polysilanes, a temperature is preferably chosen between 100 and 140° C.

To facilitate the splitting of the polysilanes in the second step of the process, and thus shorten the reaction time, it is necessary to use an electron-donating component, for example liquid ammonia or an ether for example diethylether, tetrahydrofuran or dioxan. The temperature in the second step of the process can be varied within wide limits but is preferably between 20 and 60° C.

The amount of potassium to be used depends on the degree of polymerization of the end product according to the following reaction equations (X=Cl or Br; Ph=phenyl):

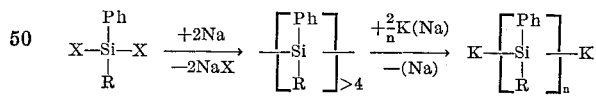

The commencement of splitting is indicated by colouration and a slight temperature rise; it can be accelerated by adding to the reaction mixture a protonactive organic hydroxyl compound, e.g., an alcohol or a carboxylic acid, in an amount between 0.01 and 0.1 mol per gram atom of Si. At the end of the reaction a brown or almost black suspension is obtained of the oragnodipotassiumsilane, sodium and sodium halide. The sodium may be removed by stirring with mercury and decanting the remaining suspension from the solid amalgam thus formed.

The novel compounds of the invention find use as intermediates in the production of other substituted silanes and for the introduction of the diorganosilyl radical into other compounds, and since the sodium halide formed as a by-product as a rule does not interfere with these applications the removal of the products of the process its removal becomes superfluous.

The following example is given for the purpose of illustrating the invention.

EXAMPLE

In a flask fitted with a rapid stirrer, reflux condenser and dropping funnel, 636 g. xylene and 33 g. sodium are heated to 110° C. and molten metal is dispersed by 10 minutes intensive stirring. Heating is then interrupted and 292 g. diphenyldichloro-silane are added to the sodium dispersion dropwise so that the temperature is kept between 110° and 120° C. A bluish-white cloudy suspension is obtained and is further stirred for 2 hours, cooled to about room temperature, mixed while stirring with 64 g. diethylether and the liquid alloy of 20 g. sodium and 93 g. potassium, and allowed to stand for 24 hours. During this time it becomes grey in the first half-hour, brown in the second, and finally almost black. After standing, 400 g. mercury are added, and the mixture is stirred for half an hour and decanted from the amalgam lying at the bottom. A fine suspension is obtained of dipotassium-diphenyl silane and sodium chloride, which can be held in stock for further use under nitrogen.

What we claim is:
1. A compound of the general formula

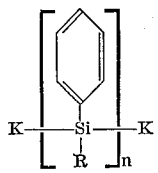

wherein $n$ is an integer from 1 to 16 and R is an aryl, alkaryl, $C_1$–$C_{12}$ alkyl or $C_5$–$C_{12}$ cycloalkyl radical.

2. Dipotassium-dipheylsilane.
3. A suspension comprising a compound as claimed in claim 1 in a liquid alkane, cycloalkane or aromatic hydrocarbon.
4. A process for the production of a compound as claimed in claim 1, which comprises gradually adding 0.5 mol of a diorganodihalosilane of the general formula $$RSi(C_6H_5)Cl_2 \text{ or } RSi(C_6H_5)Br_2$$

per gram atom of sodium to a dispersion of fused sodium in a liquid alkane, cycloalkane or aromatic hydrocarbon at a temperature in the range 98 to 200° C. with the exclusion of air and moisture, and adding to the reaction mixture thus obtained, per gram atom of Si, at a temperature below 60° C., 1 to 2 mols of a solvent with electron-donating properties and 0.125 to 2 gram atoms potassium, the potassium being alloyed with sodium in the weight ratio potassium:sodium of 4:1 to 5:1.

5. A process as claimed in claim 4 wherein the diorganodihalosilane is diphenyldichlorosilane, methylphenyldichlorosilane, cyclohexylphenyldichlorosilane, or methylphenyldibromosilane.

6. A process as claimed in claim 4 wherein the dispersion of fused sodium is in toluene, xylene, tetrahydronaphthalene or octane.

7. A process as claimed in claim 4 wherein the electron-donating solvent is liquid ammonia, diethyl ether, tetrahydrofuran or dioxan.

8. A process as claimed in claim 4 wherein a proton-active organic hydroxyl compound is added to the reaction mixture in the second stage of the process in an amount between 0.01 and 0.1 mol per gram atom of Si present.

9. A process as claimed in claim 8 wherein the proton-active organic hydroxyl compound is an alcohol or a carboxylic acid.

No references cited.

DELBERT E. GANTZ, Primary Examiner

P. F. SHAVER, Assistant Examiner

U.S. Cl. X.R.

260—46.5, 448.2E, 448.2D